Patented Mar. 13, 1945

2,371,476

UNITED STATES PATENT OFFICE 2,371,476

PREPARATION OF LECITHIN

Robert H. Sifferd, Lyons, Ill., assignor to Armour and Company, Chicago, Ill., a corporation of Illinois No Drawing. Application September 4, 1941, Serial No. 409,583

6 Claims. (Cl. 260—403)

This invention relates to processes of preparing highly purified lecithin.

Lecithin is an important phospholipin useful as a constituent in food products, for making aqueous emulsions, for incorporation in chocolate confections, and in many other industrial products and processes. One of the important sources of lecithin is egg yolk. This phospholipin is also found in foots obtained during the process of refining soy bean and other fatty oils containing lecithin.

The crude lecithin in fatty acid foots, and also as obtained in many of the processes for extracting lecithin from egg yolk, is associated with water as an aqueous emulsion. In addition to the water which is present there are also considerable quantities of extraneous materials, such as free fatty oils in the case of fatty oil foots. The problem in this art is to obtain the lecithin in high purity, and this means that the lecithin must be freed from impurities associated therewith in the crude product.

I have now discovered that lecithin can be recovered from mixtures containing it by treating such mixtures with ethylene dichloride in the presence of water. This can be accomplished in a number of ways. In accordance with this discovery I extract aqueous, lecithin-containing emulsions with ethylene dichloride, separate the ethylene dichloride layer from the residual emulsion containing the purified lecithin, and then dry the emulsion in any convenient way to remove water therefrom and yield a purified lecithin product. I can also add water to an ethylene dichloride solution containing lecithin and other materials and the lecithin is then preferentially recovered in the aqueous phase which separates. I can also treat the dry composition simultaneously with water and ethylene dichloride with thorough agitation, whereupon the composition is partitioned or distributed between the phases and the lecithin is recovered in the aqueous phase and other lipoidal constituents go into the ethylene dichloride phase.

In the production of an ethylene dichloride phase in contact with an aqueous phase, it is essential that the aqueous phase or emulsion contain about 10% or more of water. If the aqueous emulsion contains less than about this quantity of water the lecithin itself becomes soluble in the ethylene dichloride and the objects of the present invention are defeated. Therefore, my process can start with the extraction of aqueous emulsions containing lecithin, impurities associated therewith, and enough water to insure that the lecithin itself is insoluble in the ethylene dichloride used. As stated, in most cases there should be about 10% or more of water present. But this figure is illustrative only. The rule is that there should be enough water present during the extraction to prevent any substantial quantity of the lecithin dissolving in the ethylene dichloride extractant. I can also, however, dissolve impure lecithin compositions in ethylene dichloride, add enough water thereto to cause the lecithin to become insoluble in the ethylene dichloride, and recover the aqueous phase.

I shall now describe my invention more specifically with reference to the preparation of lecithin from egg yolk and the purification of crude lecithin found in soy bean oil foots obtained when soy bean oil is refined.

For the recovery of lecithin from dried egg yolk the yolk may first be extracted with alcohol. For example, about 50 pounds of dried egg yolk are mixed with 10 gallons of alcohol and the mixture stirred for about an hour. This mixture is filtered through a bag filter or in any other convenient way, and the solid filter cake reextracted three or more times in the same way with 6 gallon portions of alcohol. The alcoholic extracts are combined, filtered again, and evaporated to about 1½ to 2 gallons by ordinary distillation. About 6 gallons of water are then added and heated with agitation until the mixture assumes the characteristics of a homogeneous cream.

About 10 gallons of ethylene dichloride are then admixed with the crude lecithin emulsion and the mixture stirred for about twenty minutes. When the stirring is stopped the mixture breaks rapidly into two layers. The lower ethylene dichloride layer is drawn off and the supernatant aqueous lecithin curd again extracted several times with additional portions of ethylene dichloride. Under these conditions the ethylene dichloride removes non-phospholipin substances from the crude lecithin emulsion without dissolving the lecithin itself. This lecithin residue consists essentially of highly pure lecithin associated with water and any residual ethylene dichloride. The mixture is subjected to distillation or evaporation to concentrate it to about one-half to one-third of its original volume and then dried in any suitable manner, as, for example, in a vacuum drum dryer or on vacuum pans.

Alternatively, the extracted lecithin curd referred to above can be concentrated to about 50% of its original volume and the lecithin therein precipitated by the addition of an equal volume of acetone. The acetone-precipitated lecithin can then be dried at low temperature.

The product obtained is 95% to 98% pure lecithin and has a satisfactory color.

Those aqueous emulsions known as sludge or foots obtained in the refining of soy bean oil or other fatty oils containing lecithin can be treated in a similar manner. For example, soy bean oil is frequently refined by treatment thereof with steam and the impurities in the oil, which impurities contain the lecithin of the oil, precipitate in the form of sludge or foots. These foots contain considerable quantities of water which emulsifies with the lecithin. The foots are first freed as much as possible from excess oil by centrifuging and are then extracted with ethylene dichloride which removes the remainder of the oil and any pigments precipitated in the foots. For example, about one volume of centrifuged, steam-precipitated soy bean oil foots are admixed with three volumes of ethylene dichloride with agitation. The mixture is then allowed to stand until the ethylene dichloride has separated as a layer and this layer is drawn off. The extraction can be repeated three or four times with two volumes of ethylene dichloride. The extracted residue is then dried and the lecithin appears as a flaky product entirely different physically from the gummy state in which such lecithin is usually obtained.

In another method of carrying out my process, one kilogram of dry egg-yolk is agitated with 2 liters of ethylene dichloride for one hour and then allowed to stand until the solids have settled. The mixture is filtered through paper and the residue can be extracted with 2-liter portions of ethylene dichloride. The extracts are all combined and to the total are added 200 cc. of water and the mixture is thoroughly agitated. The aqueous phase is drained off and washed with one liter of ethylene dichloride. The washing can be repeated twice and the last washed mixture is filtered and dried under vacuum at about 140° F. to give 102 grams of dry, highly purified lecithin.

Ethylene dichloride appears to have distinctly different solvent properties for impurities associated with the lecithin than those which characterize many other kinds of organic solvents. For example, benzene, chlorobenzene, propylene-dichloride and many other organic solvents are unable to purify the lecithin as well as ethylene dichloride. These solvents, together with petroleum hydrocarbon solvents, give lecithins having lower purities. The yields obtained are also low in comparison with ethylene dichloride. Ethylene dichloride will give yield values of from four to eight times better than can be obtained with the solvents just referred to.

Having thus described my invention, what I claim is:

1. The process of purifying crude aqueous lecithin emulsions containing at least 10% of water which comprises extracting the aqueous emulsion with ethylene dichloride.

2. The process of purifying crude aqueous lecithin emulsions containing at least 10% of water which comprises extracting the aqueous emulsion with ethylene dichloride and then drying the extracted aqueous emulsion to obtain the lecithin in solid form.

3. The process of obtaining lecithin from egg yolk which comprises extracting the egg yolk with alcohol, adding water to the extract in an amount sufficient to provide a water content in the extract of at least 10% to form an aqueous emulsion of the lecithin and then extracting the aqueous emulsion with ethylene dichloride to remove impurities therefrom.

4. In the process of purifying a crude lecithin composition, the steps which comprise partitioning the said composition between an ethylene dichloride phase and an aqueous phase, said aqueous phase containing water in amount of at least 10% of the lecithin in said composition, and recovering the aqueous phase.

5. The process of producing purified lecithin which comprises extracting a dry substance containing lecithin with ethylene dichloride, adding water to the ethylene dichloride extract in an amount sufficient to provide a water content in the extract of at least 10%, and recovering the aqueous phase containing lecithin.

6. Process for producing a purified lecithin which comprises dissolving an impure lecithin composition in ethylene dichloride, adding water to the ethylene dichloride solution in an amount sufficient to provide a water content in the extract of at least 10%, and recovering the aqueous phase.

ROBERT H. SIFFERD.